United States Patent [19]

Molina et al.

[11] Patent Number: 5,742,147
[45] Date of Patent: Apr. 21, 1998

[54] DC BASED POWERING AND CHARGING CIRCUIT FOR COMPRESSOR SYSTEMS AND OTHER MECHANICAL DEVICES

[76] Inventors: Daniel Ralph Molina, 1389 S. Highland, Sanger, Calif. 93657; Michael Timothy Molina, 562 S. Crawford, Dinuba, Calif. 93618

[21] Appl. No.: 231,695

[22] Filed: Apr. 25, 1994

[51] Int. Cl.[6] .................. H02J 7/00; H02J 7/14; F04B 17/00; F04B 49/06
[52] U.S. Cl. .................. 320/7; 320/15; 320/16; 320/46; 417/411; 417/44.2
[58] Field of Search .................. 320/6, 7, 8, 46, 320/15–16; 417/362, 44.2, 234, 43, 411

[56] References Cited

U.S. PATENT DOCUMENTS

| | | | |
|---|---|---|---|
| 3,694,729 | 9/1972 | Jones | 320/16 |
| 4,273,513 | 6/1981 | Salina | 417/12 |
| 4,297,629 | 10/1981 | Godard et al. | 320/7 |
| 4,341,506 | 7/1982 | Klein | 417/362 |
| 4,510,425 | 4/1985 | Yokota et al. | 417/44.2 X |
| 4,527,953 | 7/1985 | Baker et al. | 417/411 X |
| 4,564,798 | 1/1986 | Young | 320/6 |
| 4,627,243 | 12/1986 | Schaub | 417/44.2 |
| 4,787,827 | 11/1988 | Hinkle et al. | 417/234 |
| 5,126,649 | 6/1992 | Osanai | 320/46 |
| 5,225,761 | 7/1993 | Albright | 320/15 |
| 5,233,282 | 8/1993 | Iwashita | 320/7 |
| 5,301,456 | 4/1994 | Jobin et al. | 43/113 |
| 5,450,321 | 9/1995 | Crane | 320/2 |

*Primary Examiner*—Peter S. Wong
*Assistant Examiner*—K. Shin
*Attorney, Agent, or Firm*—John P. Halvonik

[57] ABSTRACT

A DC powered compressor system that uses a series of 12 volt batteries to provide multiple units of 12 volts power to a compressor motor as needed. A circuit arrangement comprises: a series of 12 volt batteries, a charging unit for the batteries when they are not powering the motor, and several switches to connect the batteries to the compressor motor when low pressure is detected. The arrangement allows the batteries to power the motor with a voltage equal to the sum of the batteries in series when low pressure in the compressor is detected and to allow a charging unit to charge the batteries when the motor is not being powered. A pressure switch in connection with the tank of the compressor activates the switches which disconnect the batteries from the charger and reconnects them to the motor upon detecting a drop in pressure in the tank.

2 Claims, 3 Drawing Sheets

DC BASED POWERING AND CHARGING CIRCUIT FOR COMPRESSOR SYSTEMS AND OTHER MECHANICAL DEVICES

BACKGROUND OF THE INVENTION

The intention relates to the field of compressors and in particular to a powering system that is based on direct current (DC) sources of electricity. It is believed that DC sources, typically batteries are advantageous to use in such systems as they are readily portable and do not rely on electrical outlets for their continuing use.

Among the capabilities of the applicant's system is the ability to use the batteries to power the motor when power is needed and theft charge the batteries when they are not needed to power the motor. It is thought convenient to be able to charge the batteries with a 12 volt charging system, without having to manually disconnect them every time they need to be charged. Because of the large power drains in such a battery powered compressor the ability to charge without disconnection becomes important. The ability to be able to quickly reconnect the batteries to the motor also becomes important because such compressors will frequently need to be powered as the pressure in the tank runs down.

12 volt batteries are preferred in the invention because of their compatibility with 12 volt batteries in automobile charging systems thus allowing the batteries to be charged by readily available systems found in vehicles.

While there are DC powered compressors that are known, none that applicants are aware of use the particular circuit arrangement described herein which allows for multiple 12 volt batteries to be connected in series and for charging of the batteries when they are not being used in driving the compressor motor. The invention also involves the use of switches to connect and disconnect the batteries to the charging source and to the compressor motor as needed. Such switches may be any state of the art kind that have ports that are normally closed and also those that are normally open so that some of the leads to such ports will be normally conected and others will be normally disconnected.

SUMMARY OF THE INVENTION

A DC powered system for driving a compressor. The powering circuit includes a series of 12 volt batteries connected to deliver 12 volts of power, or a multiple thereof, to a compressor motor. A secondary circuit arrangement connects the series of batteries to a charging unit e.g. a 12 volt battery for charging of the batteries when they are not being used to drive the motor. Switches (e.g. contactors or solenoids) in the circuit prevent inadvertent discharge of the total voltage of the batteries back through the charging system.

Normally, the batteries are connected to the charging system (e.g. a vehicle alternator). A pressure switch in connection with the tank of the compressor activates the switches upon detecting a drop in pressure in the compressor tank. These switches may take the form of solenoids which, upon being powered by the drop in pressure, disconnect those relays that connect the batteries to the charging system and simultaneously connect those connections between the batteries and the motor to thereby drive the motor. The solenoids used will need a certain voltage (say 12 volts) to activate them, after which they will complete the circuit connecting the motor to the series of batteries.

It is among the objects of the invention to provide a compressor powering system that is based on direct current electricity and so provide a readily available source of portable power in the form of batteries and compressed air.

Another objective is to provide a series of 12 volt batteries as a ready source of power for a compressor motor and to enable such batteries to be readily charged by available vehicle charging systems or similar systems when the motor does not need to be driven.

Another objective is to provide a system for charging a series of batteries are automatically when such batteries not being used to drive a motor.

Another objective is to provide a charging system for batteries of the same voltage potential which are connected in series to produce a multiple of the individual voltage levels in order to be readily accommodated to motors that require voltages greater than that of the individual batteries.

Other objectives of the invention will be readily apparent to those skilled in the art once the invention has been described.

DESCRIPTION OF THE PREFERRED EMBODIMENT

Figure 1:
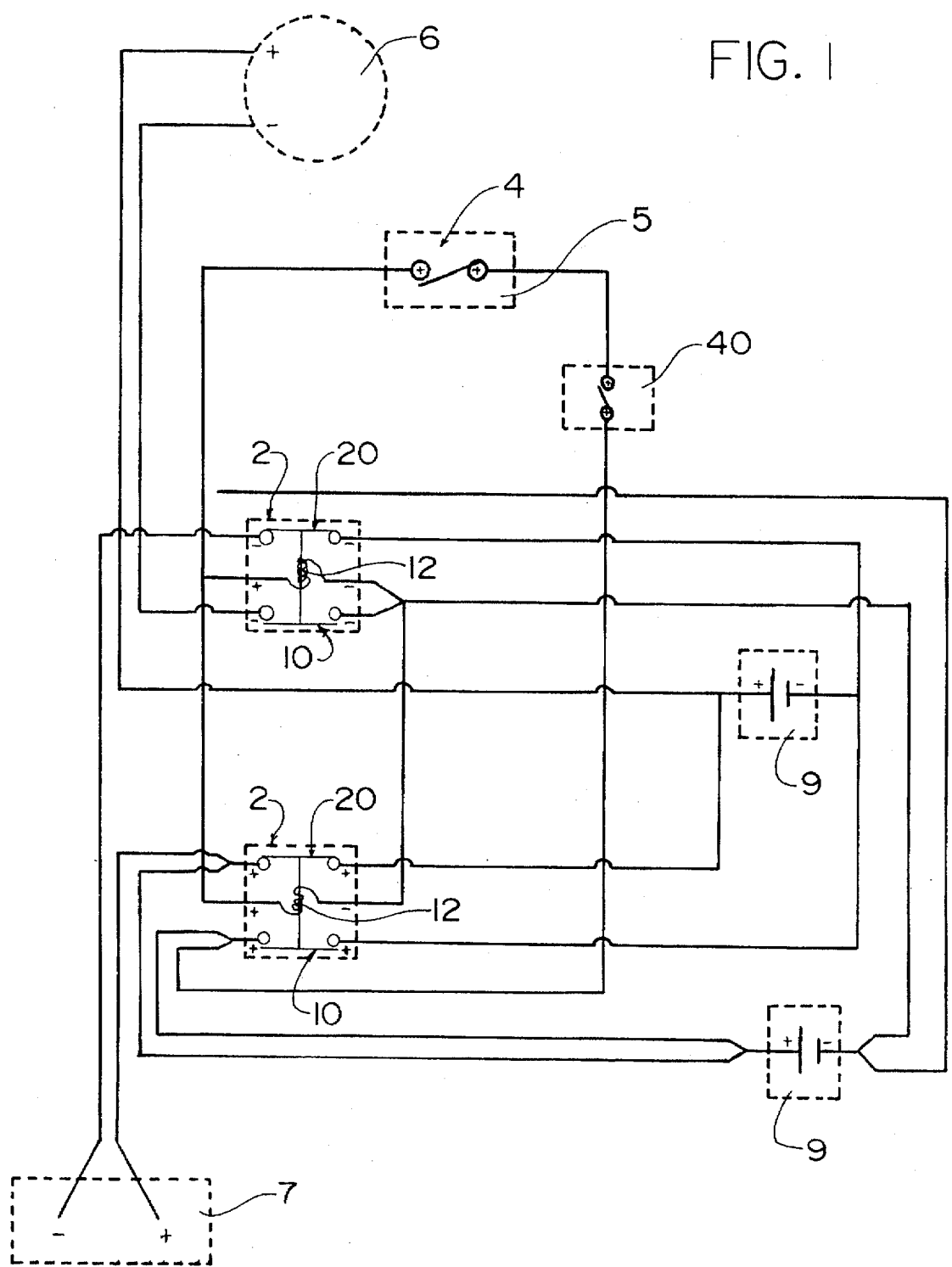
FIG. 1 Circuit diagram using two batteries
Figure 2:
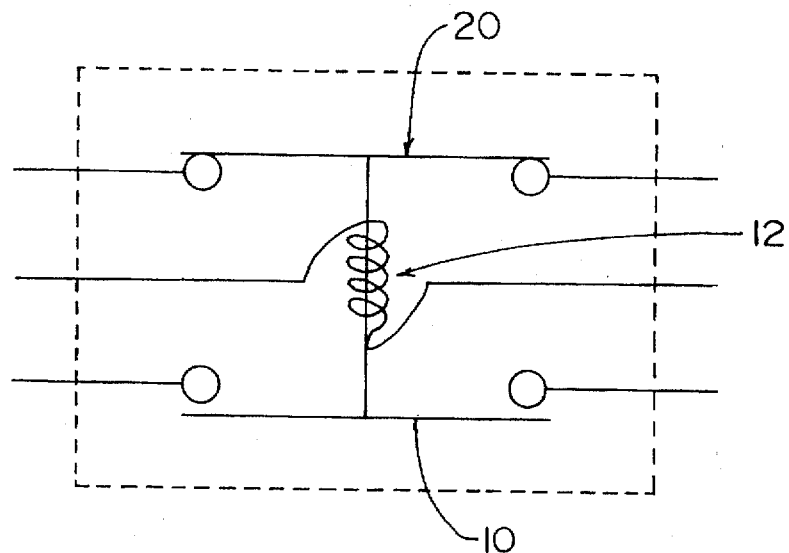
FIG. 2 Detail of a contactor or relay with two types of switches.

The overall circuit for a two battery system is shown in FIG. 1. This powering circuit provides two 12 volt DC power sources (preferably 12 volt batteries) for a total of 24 volts to the compressor motor as needed. The motor 6 (preferably DC) should be chosen so that the voltages needed to drive it is appropriate for the number of batteries used in the powering circuit.

Contactors (also referred to as relays or solenoids) 2 are energized by the pressure activated switch 4. When the sensor 5 senses a drop in the pressure in the tank 11 of the compressor 8 it closes the switch. When the tank pressure falls below a certain value, the sensor mechanically makes an electrical connection between the battery and the coils 12 in the contactors, thus, powering the coils with a voltage equal to that of the battery. (Preferably this will be a 12 volt battery and, hence, the solenoids will be activated upon receiving 12 volts).

The contactor 2 should be chosen so that it has both normally open and normally closed switches that will be switched when the coil in the contactor is energized. Those relays 10 in the contactor that are normally open (when the coil is not energized) will close, thus connecting the batteries in a series and connecting this circuit to the motor. This will send 24 volts of power to the motor in a two battery system (more volts, of course, would be sent when more than two batteries are used). Those relays 20 in the solenoids or contactors that are normally closed will be disconnected and, thus, the charging circuit 7 will be simultaneously disconnected from the batteries.

When the pressure sensor senses that the pressure in the compressor tank is adequate the switch 4 at the tank will disconnect the 12 volt circuit, thus cutting off power in the coils in the solenoids and returning the switches to their normal, off, positions. Thus, the charging circuit will be reconnected to the batteries and the batteries will be disconnected from the motor and the series configuration. In the normal or "off" position those relays 10 are normally open and those relays 20 are normally closed. The reverse is true when the solenoid is charged up by power from the pressure switch. In the preferred embodiment, the sensor chosen is a pressure sensor. However other sensors that measure a variety of properties such as: noise, light, temperature, and pH may be chosen. The sensor should be able to close a switch in reaction to a change in certain property.

When the solenoids are energized they will complete the powering circuit and disconnect the charging circuit simultaneously so that the sum total of the individual battery voltage potentials are delivered to the motor. In the case of 2 batteries this will be 24 volts. In the case of three-36 volts, see FIG. 3. This voltage will power the motor and thereby drive the compressor pump until the pressure switch senses the pressure in the tank is adequate. At which point, the pressure switch will turn off the solenoids and this will disconnect the batteries from the motor and the in-series configuration and, simultaneously, connect the batteries to the charging circuit.

Any state of the art switches that have capability for both normally closed and normally open contacts may be used in the contactors. This could include solenoids and contactors. They should be chosen so that they can do continuous duty without much wear.

The leads from the charging circuit may be connected as shown. Both leads may be connected to one of the normally closed switches on separate contactors. The connection of the leads should be chosen to insure proper charging of the batteries, i.e. so that the batteries are connected in to the charging unit in parallel when the pressure switch is off and that the batteries 9 will be connected in series to the motor when the pressure switch is activated.

In the normal operating mode the batteries are in series and thus provide power equal to N times the voltages of N number of batteries. In both FIGS. 1 and 3 one battery powers all the coils 12, the first battery may serve for this purpose.

Figure 4:
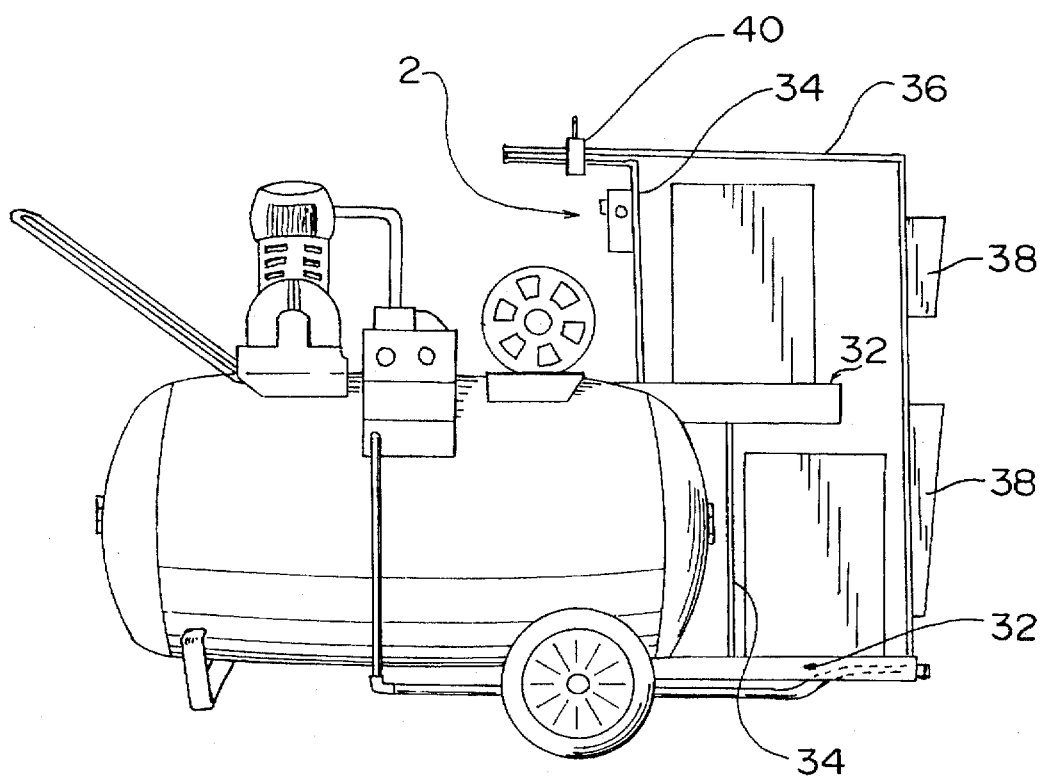
FIG. 4 Wheeled trailer in use with the system.

A vehicle with wheels as shown in FIG. 4 may be used to make the entire system, including compressor, motor, batteries and solenoid switches, mobile. The compressor is wheeled as shown and the motor 34 is connected closely to it. A rack 30 with shelves 32 and shields 34 is used for holding the batteries and switches. A cover lid 36 may be built on the rack with pockets and a tray for protection and convenience and for storing accessories and paper.

Fuses may be used to prevent excess current flow in the event of failure of one of the components. Diodes may also be used to prevent the back flow of electricity through the connections which could otherwise lead to damage to the charging unit. An on/off switch 40 can be used in the circuit as shown in FIGS. 1 and 3.

Figure 3:
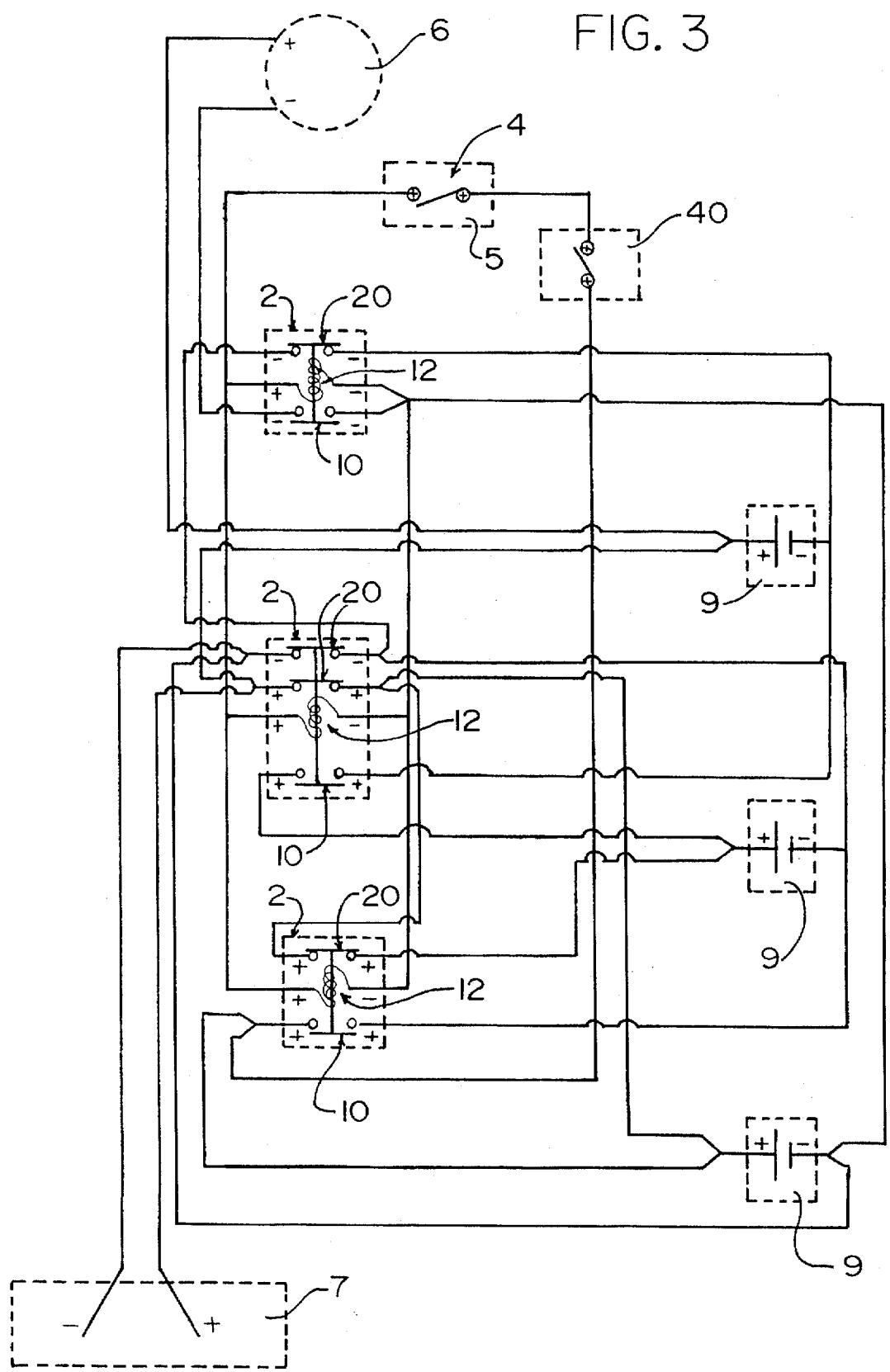
FIG. 3 Circuit diagram using three batteries.

The system shown in FIG. 3 uses three batteries, however more batteries could be connected in series to provide a power voltage equal to N times the number of batteries. The three battery system is connected in similar fashion to the two battery system. The switches (e.g. solenoids) will close the normally open connections from the batteries to the motor and connect the batteries in series when the pressure switch senses a drop in pressure. At the same time, the switches will disconnect the normally closed connections to the charging system. Again, when the pressure reaches an adequate level, the switch will turn off the solenoids and the charging circuit will be reconnected and the motor disconnected.

It is preferred that the batteries used be of the 12 volt variety as these are readily available and may be charged by standard batteries in vehicles e.g. cars and trucks. The system could be set up with other size batteries without varying from the spirit of the invention. Obviously, one must find a compressor motor that will be compatible with whatever voltage that occurs when the series of batteries are connected, for example if three 12 volt batteries are connected in series than the motor must be compatible with 36 volts of power.

We claim:

1. A direct current based powering and charging system for powering a compressor, comprising: an electric motor in connection with an air compressor, at least two 12-volt, direct current, batteries connected in series to said electric motor to form a powering circuit, a charging circuit comprising a parallel electric connection of said batteries in connection with a means for charging said batteries, said charging circuit and said powering circuit in connection with a switching means for making either of said switching and said charging circuits operable, said air compressor in connection with an enclosed tank containing air under pressure, said air compressor having a means to increase the pressure of said air, a sensor in connection with said tank and having a means for measuring when said pressure of said air is at or below a certain optimal pressure, said sensor in connection with said switching means so that said switching means will operate said charging circuit when said pressure in said tank is optimal and for operating said powering circuit when said pressure in said tank is below said optimal pressure.

2. The apparatus of claim 1 having a wheeled vehicle in connection with said batteries, said compressor and said motor, said vehicle having means for supporting said batteries, said compressor and said motor.

* * * * *